March 10, 1936.   T. J. PENNINGTON   2,033,354
MANUFACTURE OF DIAPHRAGMS
Original Filed Sept. 8, 1933   3 Sheets-Sheet 1
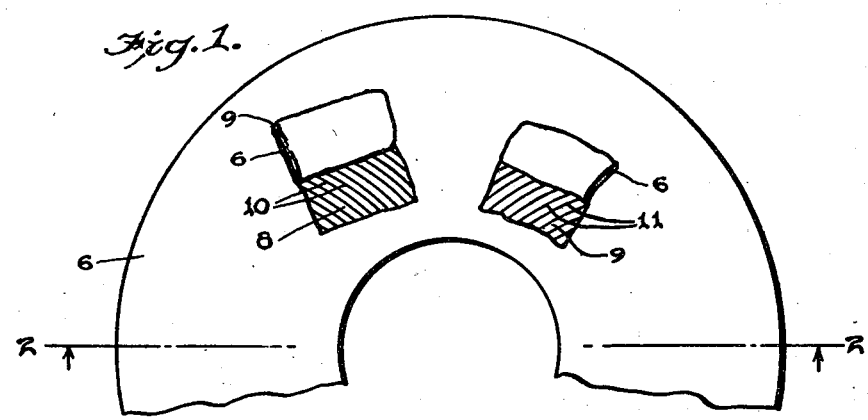
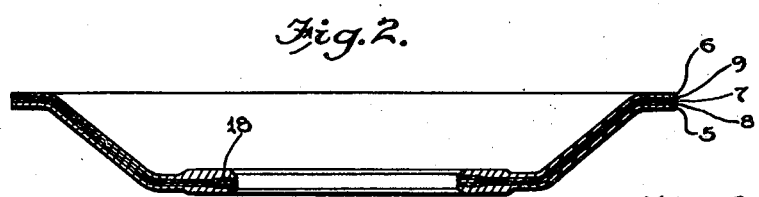
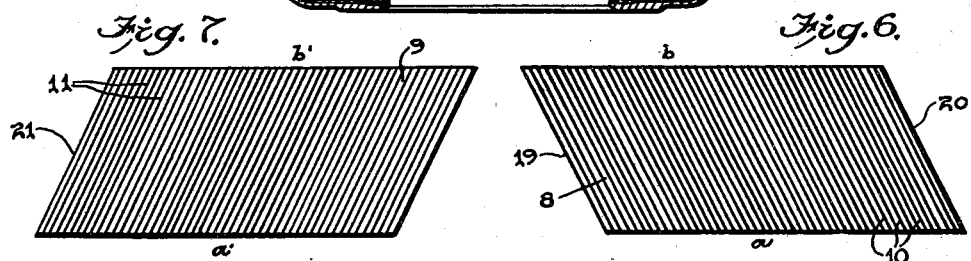
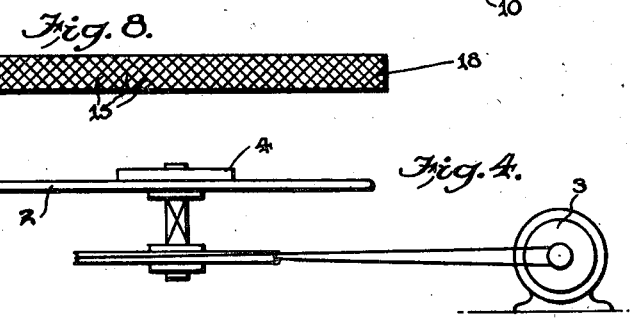
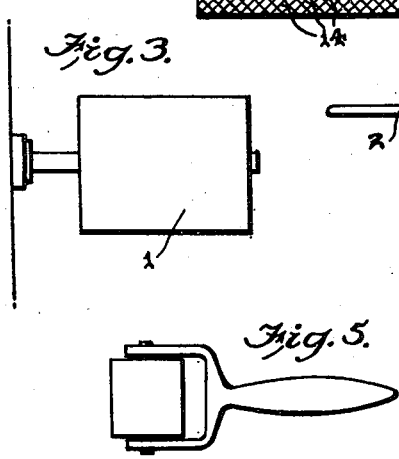
Inventor
THOMAS J. PENNINGTON
BY Arthur Middleton
Attorney March 10, 1936. T. J. PENNINGTON 2,033,354
MANUFACTURE OF DIAPHRAGMS
Original Filed Sept. 8, 1933    3 Sheets-Sheet 2

Inventor
THOMAS J. PENNINGTON
BY Arthur Middleton
Attorney

March 10, 1936. T. J. PENNINGTON 2,033,354
MANUFACTURE OF DIAPHRAGMS
Original Filed Sept. 8, 1933  3 Sheets-Sheet 3
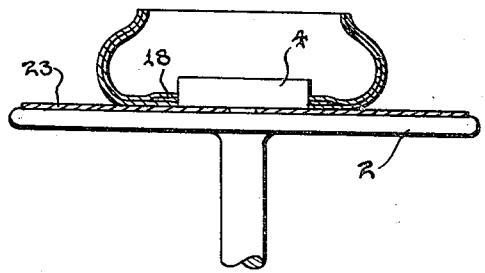
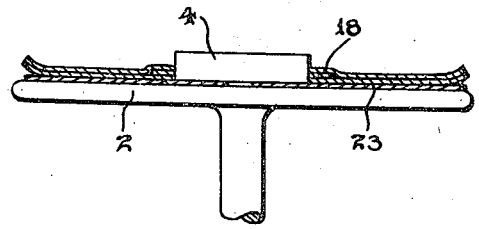
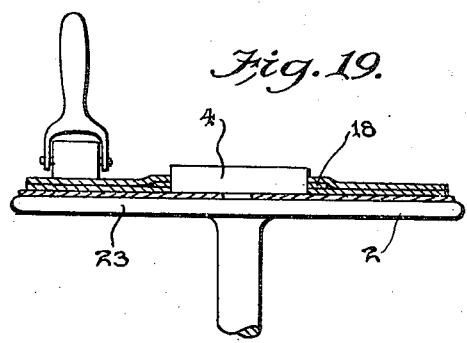
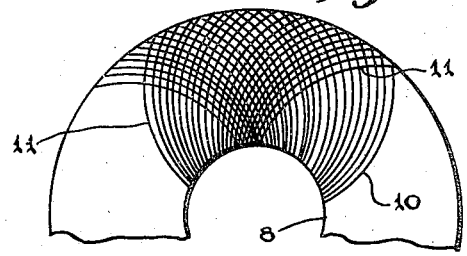
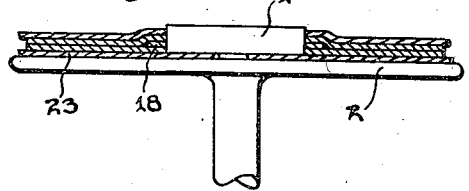
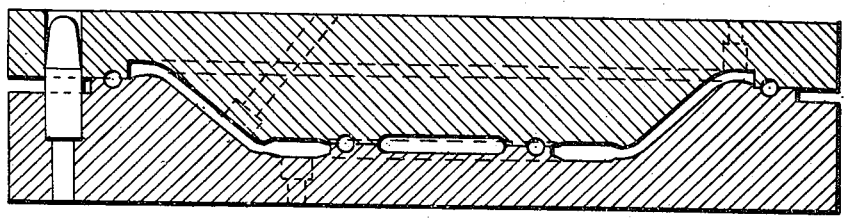
Inventor
THOMAS J. PENNINGTON
BY
Attorney Patented Mar. 10, 1936

2,033,354

UNITED STATES PATENT OFFICE 2,033,354

MANUFACTURE OF DIAPHRAGMS

Thomas J. Pennington, Denver, Colo., assignor to The Dorr Company, Inc., New York, N. Y., a corporation of Delaware Original application September 8, 1933, Serial No. 688,670. Divided and this application November 20, 1934, Serial No. 753,797

5 Claims. (Cl. 137—157)

The invention relates to diaphragms of appropriate configuration having reinforcing elements embedded therein, to the method of manufacturing or producing such reinforcing elements, and to the method of producing a diaphragm whereby such reinforcing elements are employed.

A diaphragm of the type to which this invention particularly relates has a body which flexes as to a certain portion thereof, for example as a central portion of the diaphragm, and moves or is moved relative to another portion thereof, for example relative to a peripheral portion of the diaphragm. Such a diaphragm has a general field of use for example as a diaphragm in a pump, as a diaphragm in an air brake construction, as a diaphragm in a fluid governor construction, as a diaphragm in a valve construction, and as a diaphragm in many other places and it is frequently referred to under and by the general characterizing name of "pump" diaphragm. The expression pump diaphragm as used herein is to be broadly construed as defining a diaphragm of the general type herein described regardless as to whether it is primarily designed or intended for use in a pump or in some other place. A diaphragm to which the present invention is directed comprehends the employment, as a part thereof, or in other words as an essential part of the body thereof, of rubber or other suitable flexible relatively impervious material or compound which will enable the production of a diaphragm that will flex and answer the requirement of a flexing or pump diaphragm.

Among the compounds that may be used there may be included the synthetic rubber compound made by the Du Pont Company and known as "Duprene".

The expression rubber as employed herein is to be broadly construed as comprehending not only rubber such as ordinarily used for diaphragms but also any and all flexible compounds that can be used in diaphragms as a substitute for or as an adjunct to rubber.

One object of the invention is to provide a diaphragm construction of the type referred to in which along each of the several radial lines of the diaphragm the structural characteristics of the diaphragm are the same, whereby in use each of the several radial sections of the diaphragm is subjected to the same operating strains and conditions and has the same structural strength.

Another object of the invention is to provide a reinforcing element that is constructed so as to comprise a plurality of layers, for example, two, in which the reinforcing fibers of one layer as crossed by a radial line, make or have positive angles of slope relative to the radial line and in which the reinforcing fibers of another layer as crossed by said radial line make or have negative angles of slope relative to said radial line.

According to the preferred arrangement, each of the reinforcing fibers as embodied in the ultimate diaphram extends outwardly from the center towards the peripheral portion thereof. The reinforcing fibers in one layer extend outwardly and slightly forwardly and gradually curve so that the outer portions thereof extend sharply forward and the reinforcing fibers of the layer adjacent to the first mentioned layer extend outwardly and slightly rearwardly and gradually curve so that the outer end portions thereof extend sharply rearwardly.

Another object of the invention is to produce a reinforcing element so that when embedded between opposing layers of rubber it can be employed for the production of the pump diaphragm as herein described.

One aspect of the invention relates to the method of producing the reinforcing element and according to this aspect thereof I produce a cylindrical shell-like construction comprising inner and outer members formed of cord fabric material out on the bias. The inner and outer members of the shell are suitably stuck together or caused to adhere to each other as by rubber cementing material, and thereafter with one end of the cylindrical shell as an ultimate central portion for the reinforcing member, the shell is expanded by a "working out" or stretching operation under conditions whereby the fabric portions providing the other end of the cylindrical shell structure ultimately provide the peripheral portions of the reinforcing element.

Another aspect of the invention relates to the mode of producing the reinforcing elements and the assembling of the same in relation to the rubber cover members which ultimately produce the pump diaphragm to which the invention relates.

With these and other objects in view, the invention consists in the construction and novel combination and arrangement of parts hereinafter fully described, illustrated in the accompanying drawings, and set forth in the claims hereto appended, it being understood that various changes in the form, proportion, and minor details of construction, within the scope of the claims, may be resorted to without departing from the spirit of the invention or sacrificing any of the advantages thereof.

As illustrative of the manner in which the invention may be carried out and realized, reference is made to the accompanying drawings forming a part of this specification and in which drawings:

Figure 1 is a plan view of a section of a diaphragm, one cut showing a portion of the upper facing or upper rubber cover member broken away and folded back, and the other showing both the rubber cover member and the upper or reinforcing element broken away and folded back, all so as to show different sets of reinforcing cord elements and their mode of and relative disposition within the pump diaphragm.

Fig. 2 is a vertical cross sectional view taken on the line 2—2 of Fig. 1, looking in the direction of the arrows.

Fig. 3 is illustrative of a spool which may be employed as a form upon and by which the cylindrical shells herein referred to are produced.

Fig. 4 is a power driven horizontal disc upon which the cylindrical shells are "worked out" or extended in the producing of the reinforcing element, and also upon which the complete diaphragm is assembled. This disc may also be turned by hand.

Fig. 5 shows a "stitcher" which is employed in effecting proper adhesion of members or parts the surfaces of which are already in sticky condition, and which can also be used as a "working out" tool.

Figs. 6 and 7 illustrate pieces of card fabric cut on the bias and which are employed to provide the inner and outer members of the cylindrical shell construction which is produced in the making of the reinforcing elements employed in the construction of the pump diaphragm.

Fig. 8 shows a strip which is employed as a reinforcing ring when the cylindrical shell construction is produced.

Figure 9:
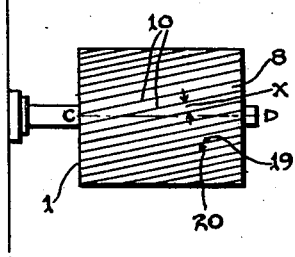
Fig. 9 illustrates a fabric strip formed into an inner member of the cylindrical shell construction as by positioning and curving the fabric piece shown in Fig. 6 in place on the spool shown in Fig. 3.
Figure 10:
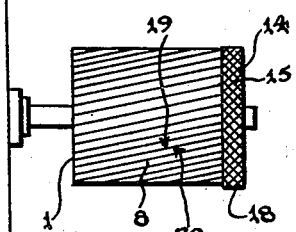
Fig. 10 shows the reinforcing strip shown in Fig. 8 when applied in place and stitched to the fabric shown in Fig. 9.
Figure 11:
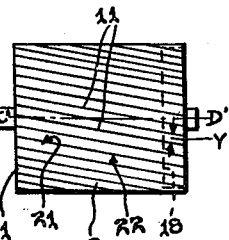
Fig. 11 shows the fabric of Fig. 7 when applied and stitched to the shell member and reinforcing ring shown in Fig. 10.
Figure 12:
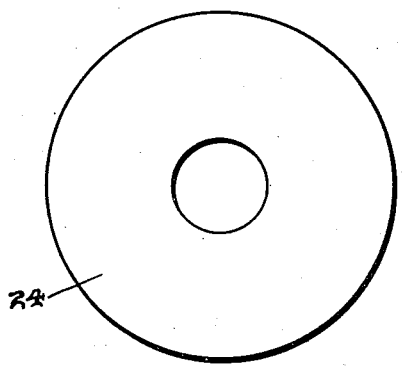
Figs. 12 and 13 are illustrative of upper and lower cover members of rubber which may be employed for providing the upper and lower cover or face portions of the ultimate pump diaphragm.
Figure 14:
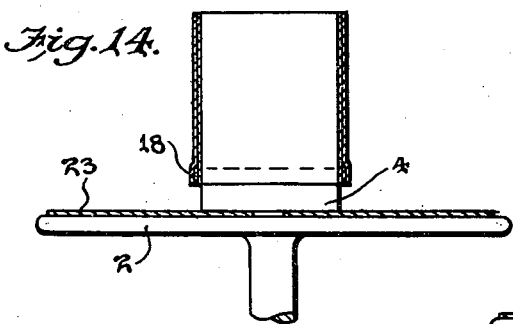

Fig. 14 shows the apparatus of Fig. 4 with the lower cover or face member of Fig. 12 in place thereupon and with the cylindrical shell produced as indicated in Figs. 9, 10, and 11 in preliminary position relative to the lower cover or face member just referred to. In Fig. 14 and in Figs. 15 to 20 hereinafter referred to the cylindrical shell, the intermediate reinforcing member resulting therefrom, and the cover member or members of the diaphragm appear in vertical cross section on the rotating horizontal disc of Fig. 4.

Figure 15:
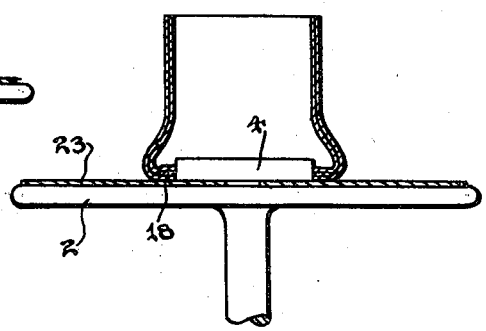

Fig. 15 shows the cylindrical shell which has been positioned downwardly as by the stitcher and in such a manner that the lower end of the cylindrical shell is stitched in place to the upper face portion of the lower cover, the upper face portion of the rubber in the lower cover preferably having been made adhesive just prior to the positioning and stitching operations.

Figure 16:
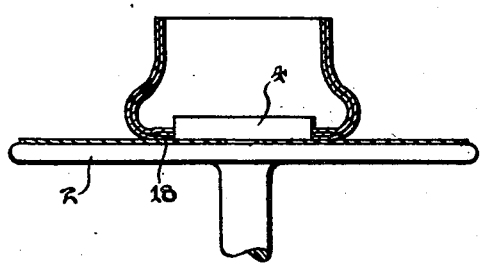

Figs. 16, 17, and 18 show the manner in which the cylindrical shell is worked outwardly progressively from an end thereof until, as shown in Fig. 18, there is nearly completed the reinforcement or reinforcing element for the ultimate pump diaphragm.

Fig. 19 illustrates the form which the cylindrical shell has ultimately been caused to assume as the result of stretching and stitching operations, and from Figs. 16 to 19, inclusive, it will be noted that the stitcher has been worked from the central portion gradually towards the peripheral portion as the carrying disc rotates, with the result that the reinforcing element thus produced is flat and has firm adhesion to the lower cover member.

Figure 13:
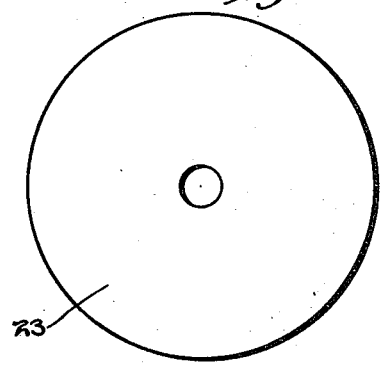

Fig. 20 shows the parts after the top cover member shown in Fig. 13 has been properly applied.

Fig. 21 is a plan view diagrammatically showing the result of the expanding or working out operations of the shell above described and it shows the general form which the reinforcing fibers, to-wit, the cords of the fabrics, are caused to assume.

Fig. 22 is illustrative of a vulcanizing die or mold which may be used in carrying out the final shaping and vulcanizing operation.

Reference will now be made to the drawings in detail. As above indicated, the equipment used in carrying out the process comprises the spool 1, shown in Fig. 3; the horizontal disc 2 rotatable about a vertical axis and which is driven in any suitable manner as by the motor 3, and which disc also has for use in conjunction therewith a removable small disc 4; and a "stitcher"—shown in Fig. 5—the main function of which is to stitch, press or roll one layer of material against another in order to effect a firm adhesion of one layer of material in respect to another layer of material. This stitcher can also be employed for working out, stretching or otherwise positioning in certain manners according to requirement the materials being operated upon.

It will be noted that the pump diaphragm shown in Figs. 1 and 2 may be considered as comprising a lower surface or cover portion 5 of rubber, an upper surface or cover portion 6 of rubber, and a reinforcing element 7 comprising a plurality of adjacent layers as 8 and 9, consisting of or comprising essentially reinforcing fiber elements as 10 and 11. The reinforcing elements are shown as being made up of and from pieces of parallel thread or cord fabric such as pieces 8 and 9, shown in Figs. 6 and 7, and which when reshaped form the layers 8 and 9 of the reinforcing element 7 previously mentioned. The fabric is cut so that the fibers or cords 10 and 11 thereof extend diagonally from the vertical respectively as along the lines a—b and a'—b'. The cords of each piece may be relatively close and are preferably relatively strong. The cords of each piece 8 or 9 are preferably adhesively secured together whereby in the forming operations to which each piece 8 and 9 is subjected the cords can readily adjust themselves to the required conditions.

The reinforcing ring portion or band 18 which is relatively narrow is preferably arranged so that the fibers 14 and 15 thereof extend diagonally to the long dimension thereof. In short, the reinforcing ring or band 18 is formed of woven fabric material cut on the bias.

In forming the cylindrical shell which provides an important aspect of this invention, the fabric piece 8 shown in Fig. 8 is preferably—but not necessarily—placed around the spool 1. When such a fabric piece as 8 is used it is of a length such that the opposed ends thereof 19 and 20 abut when the member made therefrom is completed. This arrangement is as shown in Fig. 9, and it will be noted that the cord members 10 slope relative to a longitudinally extending element $c$—$d$ so as to make an angle which may be designed as a negative angle X. This longitudinally extending element $c$—$d$ of course parallels the longitudinal axis of the cylinder. This provides what may be considered as the inner member of the cylindrical shell construction. Next there is applied the member providing the reinforcing ring 18 as shown in Fig. 10, and this reinforcing ring 18 is stitched or secured in place by the employment of the stitcher shown in Fig. 5. There is next applied the piece of fabric 9 shown in Fig. 7, and this piece of fabric is of such a length that the ends 21 and 22 thereof abut when in place. Here again the stitcher is employed to effect a firm union.

In Fig. 11 it will be noted that the cord fibers or members 11 slope relative to the longitudinal elements $c'$—$d'$ and that there results a positive angle of slope indicated by Y.

A piece of suitable material 23, such as rubber, constituting the stock for the lower portion 5 of the diaphragm, as shown in Fig. 13, is placed upon the disc 2. This disc may be fifteen inches in diameter or any other size suitable for the purpose, and when in place there can be brought into assembled position in respect thereto the cylindrical shell construction produced as above described, preferably after it has been removed from the spool 1 upon which the shell construction was formed. A small removable disc 4 can be employed as a means for centering and positioning the cylindrical shell construction on and in reference to the bottom cover member 23, which is then on the disc 2. Rubber cement may be placed upon the disc 2 before the lower cover member 23 has been applied thereto and suitable material as benzine is preferably brushed over the cover to make it tacky whereby as the cylindrical shell is worked out and stretched as herein described the shell can be caused to firmly adhere to the stock of the lower cover member.

When the parts are thus assembled as shown in Fig. 14, one of the first operations is to work down the lower edge portions of the cylindrical shell somewhat after the order shown in Fig. 15, and in doing this the stitcher is preferably employed. The turning of the disc 2 during this operation may be by hand. The motor when it operates to rotate a disc of the size designated is preferably connected so as to revolve the disc at about 200 revolutions per minute.

After the parts have been caused to assume the positions shown in Fig. 15 with the lower end of the cylindrical shell firmly secured to the stock 23 providing the lower cover portion, internal pressure is applied to the walls of the cylindrical shell portion as by the employment of the stitcher or otherwise so as to gradually work out and stretch—and so as to stitch to the lower cover portion 23 the material constituting the wall portion of the cylinder, to-wit, as according to the progressive manner indicated by Figs. 16, 17, and 18. In other words, one end of the cylindrical shell, namely the end containing the reinforcing ring 18 has been selected to provide the central portion of the reinforcing element, and the material constituting the upper part of the shell is gradually worked away from the end thus selected and in an outward direction until there is finally produced the flat construction almost completed as shown in Fig. 18 and completely finished in Fig. 19. It will also be observed that that portion of the cylindrical shell which previously constituted the inner surface thereof has now become the top surface of the relatively flat or extended reinforcing element and when this expanding operation has been carried out the cord fibers of the fabric will be shaped as illustrated in Fig. 21. In short, these cord fibers of the fabric now become reinforcing fibers that extend outwardly from the central portion of the reinforcing element to the periphery thereof. These reinforcing fibers of one member of the reinforcing element all extend outwardly and gradually forwardly and gradually curve until the outer ends extend sharply forwardly, while in the other member of the reinforcing element the reinforcing fibers thereof extend outwardly and gradually rearwardly and gradually curve until the outer ends thereof extend sharply rearwardly. It will also be noted that along any one radial line selected, and it makes no difference which radial line is selected, there is a symmetry of arrangements of these reinforcing fibers in respect thereto. In other words, no matter where taken, any one radial line crosses the reinforcing fibers and it will be noted the reinforcing fibers in one member all have a positive angle or positive angles of slope in reference to the radial line crossing them, while the reinforcing fibers of the other member all have negative angles of slope, and that the arrangement on opposite sides of the radial line is practically symmetrical.

After the reinforcing element has been thus made there is supplied the stock for the upper portion of the pump diaphragm, to-wit, as by the member designated by 24, and when these parts have been all stitched together they are subjected to any suitable finishing and vulcanizing operations, to-wit, by instrumentalities such as shown in Fig. 22.

A reinforcing element constructed and embodied in a diaphragm as herein disclosed constitutes a marked improvement over a reinforcing element provided by woven fabric. It will also be pointed out that in addition to the functional advantages which are imparted to the new diaphragm by the use of the reinforcing element constructed as herein disclosed there is also an advantage in that in the manufacture and production of the new reinforcing element only a small amount of cord fabric is wasted, while in all previous methods, which required circles of fabric to be cut from rectangular or square pieces, after which the large central hole was cut out, there is a loss of about 45% of the fabric.

This case is a division of my application Serial No. 688,670 filed September 8, 1933.

What is claimed is:

1. A pump diaphragm comprising a rubber body of appropriate configuration and a plurality of layers of symmetrically disposed reinforcing fibers or threads embedded therein and in which the fibers or threads of adjacent layers are angularly disposed with respect to each other and are arranged so that the reinforcing fibers of threads are similarly arranged in respect to each radial line whereby for each radius the reinforcing fibers or threads in one layer cross the particular radial line and have slopes defined by positive angles and whereby the reinforcing fibers or threads in the next layer or layers cross the particular radial line and have slopes defined by negative angles.

2. A pump diaphragm comprising a rubber body of appropriate configuration and a plurality of layers of reinforcing fibers embedded therein and in which the reinforcing fibers of one layer extend from the central portion of the body in a general outward direction, first outwardly and gradually rearwardly, and gradually curve so that the outer portions of the reinforcing fibers slope sharply rearwardly, and in which reinforcing fibers of another layer extend from the central portion of the body in a general outward direction, first outwardly and gradually forwardly, and gradually curve so that the outer portions of the reinforcing fibers slope sharply forwardly.

3. A reinforcing element for use in a pump diaphragm construction, which reinforcing element is constructed so that it comprises in symmetrical arrangement a plurality of layers of reinforcing fibers arranged so that in respect to any one of the numerous radial lines of the pump diaphragm the reinforcing fibers of one layer have a positive angle of slope in respect to the radial line and so that the reinforcing fibers of another layer have a negative angle of slope in respect to the radial line.

4. A reinforcing element as defined in and by claim 3, in which there is a circular reinforcing ring to which the inner ends of the reinforcing fibers are secured.

5. A reinforcing element as defined in and by claim 3, in which a reinforcing fabric ring is provided between the ends of adjacent reinforcing layers provided by the reinforcing fibers and to which reinforcing ring the inner ends of the reinforcing fibers of the adjacent layers are secured.

THOMAS J. PENNINGTON.